(12) United States Patent
Koshy

(10) Patent No.: US 8,737,539 B2
(45) Date of Patent: May 27, 2014

(54) LOW COMPLEXITY ITERATIVE MIMO RECEIVER BASED ON SUCCESSIVE SOFT INTERFERENCE CANCELLATION AND MMSE SPATIAL FILTERING

(75) Inventor: John C. Koshy, Jackson, NJ (US)

(73) Assignee: TT Government Solutions, Inc., Basking Ridge, NJ (US)

(*) Notice: Subject to any disclaimer, the term of this patent is extended or adjusted under 35 U.S.C. 154(b) by 252 days.

(21) Appl. No.: 13/037,844

(22) Filed: Mar. 1, 2011

(65) Prior Publication Data

US 2012/0155560 A1    Jun. 21, 2012

Related U.S. Application Data

(60) Provisional application No. 61/309,226, filed on Mar. 1, 2010.

(51) Int. Cl.
*H04L 27/06*    (2006.01)

(52) U.S. Cl.
USPC ............................ 375/340; 375/347; 375/267

(58) Field of Classification Search
None
See application file for complete search history.

(56) References Cited

U.S. PATENT DOCUMENTS

2007/0041475 A1*    2/2007    Koshy et al. ................. 375/340

* cited by examiner

*Primary Examiner* — Leon-Viet Nguyen
(74) *Attorney, Agent, or Firm* — Heslin Rothenberg Farley & Mesiti P.C.

(57) ABSTRACT

A multiple-input multiple-output (MIMO) system for demapping uses a single stream system of iterative passes in a preferred order using the latest soft-information for better interference cancellation and the minimum mean square error (MMSE) criterion.

17 Claims, 2 Drawing Sheets

LOW COMPLEXITY ITERATIVE MIMO RECEIVER BASED ON SUCCESSIVE SOFT INTERFERENCE CANCELLATION AND MMSE SPATIAL FILTERING

CROSS-REFERENCE TO RELATED APPLICATIONS

This application claims the benefit of U.S. Provisional Application No. 61/309,226, filed on Mar. 1, 2010 which is incorporated by reference herein in its entirety.

GOVERNMENT LICENSE RIGHTS

This invention is based upon work supported in part by United States Army Research Laboratory under contract DAAD19-01-2-0011. The U.S. Government has certain rights in the invention.

FIELD OF THE INVENTION

The present invention relates generally to multiple-input multiple-output (MIMO) systems for demapping using a single stream system of iterative passes in a preferred order using the latest soft-information for better interference cancellation and the minimum mean square error (MMSE) criterion.

BACKGROUND OF THE INVENTION

Recently, for multiple-input multiple-output (MIMO) systems, space-time bit-interleaved coded modulation (ST-BICM) using iterative detection has been recognized as a method for achieving near-capacity performance, and thus, enabling the best possible trade between spectral-efficiency and energy-efficiency. However, due to the complexity of the detector (also known as the demapper), this method is not amenable to practical implementation for high-rate MIMO systems targeting spectral-efficiency in excess of 16 coded bps/Hz. This is because the conventional ST-BICM iterative receiver, based on joint or maximum-likelihood (ML) detection, requires the demapper to compute the per-bit a posteriori probability (APP) considering all possible realizations of the simultaneously transmitted symbol streams. Consequently, the demapper complexity associated with the per-bit APP computation is exponential in the product of the number of simultaneously transmitted streams and the bits per symbol. To manage complexity, an approximate demapper using list sphere detection (LSD) has been proposed in B. Hochwald and S. ten Brink, "Achieving near-capacity on a multiple-antenna channel," *IEEE Trans. Commun.*, vol. 51, no. 3, pp. 389-399, March 2003. Notwithstanding the complexity reduction achieved using this approach, the complexity of LSD-based demappers is still exponential. In D. Garrett, L. Davis, S. ten Brink, B. Hochwald, G. Knagge, "Silicon complexity for maximum likelihood MIMO detection using spherical decoding," *IEEE J. Solid-State Circuits*, vol. 39, no. 9, pp. 1544-1552, September 2004, it was shown that the highest rate achievable using sphere-detection based approach, considering the limits of current silicon technology, was about 16 coded bits per second per Hz. Therefore, for high-rate MIMO with near-capacity performance, there remains a need to develop demappers that offer better performance-complexity trades.

To that end, the prior art proposed a parallel single-stream demapper (P-SSD) approach, where streams are demapped independently or in parallel on a per-stream basis rather than jointly as in the conventional joint stream demapper (JSD) approach. The term JSD is used to describe both full-search demappers as well as LSD-based partial-search demappers since both, in the end, perform some sort of joint detection over all of the transmitted streams. For a high-rate 6×4, 16-QAM, MIMO system, using the SSD approach can reduce complexity by at least an order of magnitude relative to its JSD counterpart (implemented based on the LSD approach). For non-overloaded MIMO configurations operating in low-correlation channels, the performance of the SSD method is shown to be comparable to the JSD approach. However, under less ideal conditions (for example, when the channel exhibits significant correlation and/or as fewer receive elements than transmitted streams are used for stream separation), the SSD performs much worse than the JSD. In an attempt to close this gap in these overloaded conditions, the invention proposes a single stream demapper of a successive flavor, where streams are demapped one after another according to some optimal order. The idea is that every stream uses the updated soft information of previously demapped streams to cancel and filter their contributions to the received signal vector. In contrast, the originally developed single stream demappers operate in a parallel fashion, and thus, do not exploit the latest soft information made available as streams are being demapped. Instead, it relies solely on the soft-information from the decoder to reconstruct the interfering symbols. This is a major limitation in these low-complexity receivers as cancellation can never be performed during the first iteration and cancellation during subsequent iterations leaves a greater residual interference than is warranted. Consequently, the receiver is unable to harvest the maximum possible diversity during any iteration.

In the ST-BICM (also known as "iterative" or "turbo" detection) framework, the established theory and practice is to use the per-bit soft-information (or log likelihood ratio value) from the decoder as a priori information for the MIMO detector (or demapper).

It is little surprise then that, in the prior art there are descriptions of various flavors of the parallel single stream demapper, the soft-information from the decoder is precisely what is being prescribed to be used for reconstructing the symbol values which are required for interference cancellation. It is impossible to state with 100% certainty why all of these proposed methods used this same approach (of relying on the decoder for symbol reconstruction and interference cancellation) and did not consider the use of the demapper output to reconstruct symbols (which is exactly what would be required to implement a successive approach). But it is conceivable that there are several reasons for not considering this option:

1) Relying on the demapper output for interference cancellation means that all streams will not benefit from interference cancellation uniformly in the first iteration; the stream that is demapped first does not benefit from any cancellation whereas the stream that is demapped last benefits from the greatest cancellation.

2) It begs the question of an "optimal" order for demapping streams as any sub-optimal ordering can result in worse performance through error propagation.

3) There may be some confusion as to what is to be done in subsequent iterations when a priori information from the decoder becomes available; is soft-information used from the decoder or from the demapper (which becomes available one at a time as streams are being detected)?

4) Last but not least, the idea from the conventional ST-BICM framework that only the decoder can feed a priori information into the demapper, may have inadvertently biased practitioners away from even considering such an option where one demapper output feeds another.

In summary, perhaps the reason that most practitioners seem to have steered away from inventing a similar approach to the present invention is due to some combination of a) bias towards a conventional ST-BICM mode of operation and b) the fact that there are one too many side issues to be considered and resolved in order to implement the successive demapping option.

Compared to MIMO detectors based on the parallel approach, the present solution is able to perform interference cancellation from the very first iteration as well as exploit the newer soft-information from demappers of previously detected streams. Consequently, the successive approach used in the present invention a) provides additional diversity gain (or increase battery life or reduce transmit power), b) decodes packets with fewer iterations (incurs less latency), c) works with smaller receive arrays, d) can work in less "MIMO friendly" channels.

The present invention provides that:

1) For a 4×4, 16-QAM, MIMO system, the performance gain (relative to the parallel approach) for a single iteration is about 0.75 dB.

2) For a 4×3, 16-QAM, MIMO system, the performance gain (relative to the parallel approach) for a single iteration is infinite. By "infinite", it is meant that a satisfactory packet error rate can never be achieved using the parallel approach, no matter how high the transmit power.

In the present invention, there is a successive-single stream demapper (S-SSD) and their performance is compared to that of the previously developed parallel-single stream demapper (P-SSD).

SUMMARY OF THE INVENTION

For multiple-input multiple-output (MIMO) systems, the space-time bit-interleaved coded modulation (ST-BICM) approach using iterative processing has been recognized as a method for achieving near-capacity performance. However, the a posteriori probability calculator in the MIMO detector, relying on exhaustive or partial search of candidate bit vectors, is not amenable to practical implementation at high rates ($>=16$ raw bits per channel use) due to its exponential complexity in rate. This motivates the need for newer MIMO detectors with more manageable complexity. To solve this problem, a parallel single stream demapper (P-SSD) approach [P-SSD A], [P-SSD B] is proposed, where streams are demapped independently (or in parallel) on a single-stream basis rather than jointly as in the conventional joint stream demapper (JSD) approach. The term JSD is used to describe both full-search demappers [ST-BICM A] as well as LSD-based partial-search demappers [ST-BICM B] since both perform joint detection over all transmitted streams. For a high-rate 6×4, 16-QAM, MIMO system, when using the SSD approach, complexity is reduced by at least an order of magnitude relative to its JSD counterpart (implemented based on the LSD approach) [GWD]. For non-overloaded MIMO configurations operating in low-correlation channels, the performance of the SSD method is shown to be comparable to the JSD approach [ST-BICM B]. However, under less ideal conditions (for example, when the channel exhibit significant correlation and/or as fewer receive elements than transmitted streams are used for stream separation), performance of the SSD falls below that of the JSD [ST-BICM B]. To close this performance gap, another approach known as the group wise demapper (GWD) approach was proposed. This approach is described in U.S. Pat. No. 7,593,489 entitled "Iterative STBICM MIMO Receiver Using Group-Wise Demapping".

Previously, an approach for reducing processing complexity while retaining the performance of the complex JSD approaches, especially in overloaded MIMO configurations or non-ideal channel conditions, is the group wise demapper (GWD) approach. The GWD demapper combined the best features of the JSD and the P-SSD techniques and, thus improved the performance over an approach that was solely based on the P-SSD. However some of the intrinsic limitations of the P-SSD approach, such as not being able to perform interference cancellation in the first iteration and not exploiting the availability of newer soft-information from the demapper of previously detected streams, still leaves a sizeable performance gap between this approach and the more complex JSD approach.

The best prior art approach known is the group wise demapper (GWD). While it reduces complexity compared to the JSD approach and performs better than a detector based on a pure P-SSD approach, there is still a significant performance gap between the GWD based on the P-SSD and the JSD. This performance gap has to do with the limitations intrinsic to the P-SSD. Specifically, the P-SSD, because of its parallel approach, cannot perform interference cancellation in the first iteration (or pass) and take advantage of the latest soft-information available from the demapper output of previously detected streams, and thereby, does not enjoy the maximum receiver diversity possible during any iteration. This results in a performance loss compared to the JSD which enjoys full diversity gain in every iteration.

The present invention aims to narrow this performance gap of single stream demappers by addressing the above-mentioned fundamental limitations of the parallel approach. The challenge is to do this by demapping on a single-stream basis without resorting to some form of joint stream detection which has significantly higher complexity.

The present invention differs from prior solutions in the following ways: a) it is able to perform interference cancellation from the very first iteration (or pass), b) for subsequent iterations, it uses a combination of outputs from the decoder as well as updated soft-information from demappers (of previously detected streams) for better interference cancellation, c) since streams are demapped one after another, the order in which they are demapped becomes important; the present method proposes an ordering criterion.

The present invention further provides an approach that enables a) interference cancellation from the very first iteration and b) the use of the latest soft-information for better interference cancellation.

The invention will be best understood when the following description is read in conjunction with the accompanying drawings.

DETAILED DESCRIPTION

Figure 1:
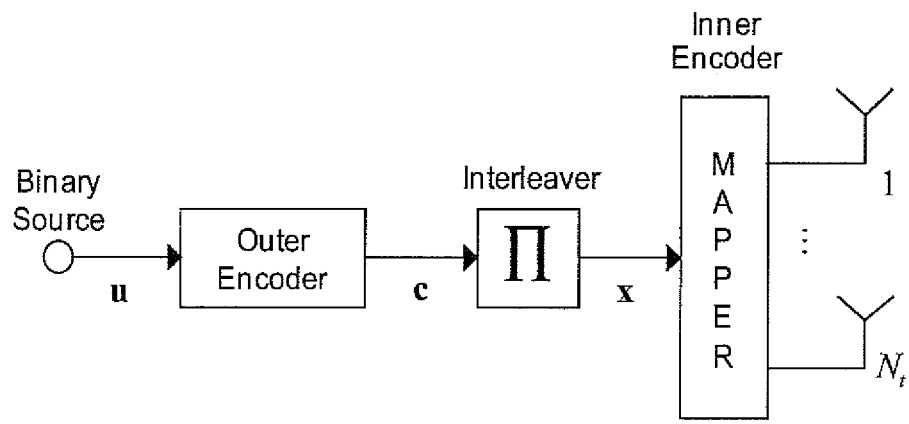
FIG. 1 is a block diagram of an ST-BICM transmitter.

Consider a ST-BICM system with $N_t$ transmit and $N_r$ receive antennas. FIG. 1 shows the transmitter. Here, the information bit sequence u is first encoded in outer encoder using an error correcting code of rate R to yield the coded bit sequence c. After interleaving in interleaver, the coded sequence, denoted by x, is split into $N_t$ independent streams. Each stream is transmitted via a unique antenna. Let the vector $x_k=[x_{k,1}, \ldots, x_{k,M}]$ denote the block of M bits that map to the k th stream symbol $s_k$. That is, $s_k=\text{map}(x_k)$, $k=1 \ldots, N_t$. Note that the symbols for each stream is chosen from a constellation of size $2^M$ and alphabet $A=\{a_i, \ldots, a_{2^M}\}$. The collection of all $N_t$ simultaneously transmitted symbols is denoted by the vector $s=[s_1, \ldots, s_{N_t}]^T$ with the corresponding bit vector $x=[x_1, \ldots, x_{N_t}]$. The $N_r \times N_t$ matrix H represents the channel between the $N_t$ transmit and $N_r$ receive antennas.

The $N_r \times 1$ received signal vector is given as $$y = Hs + n \quad (1)$$

where n is an $N_r \times 1$ vector representing the additive white noise per receive element. The elements of n are complex Gaussian with zero-mean and variance $\sigma_n^2 = N_0/2$ per real dimension. The average symbol energy per stream $E\{|s_k|^2\}$, $k=1, \ldots, N_t$ is denoted by $E_s$. It follows that the average signal-to-noise ratio per receive element $SNR = N_t E_s/(2\sigma_n^2)$. It is assumed that the channel H is perfectly known to the receiver, and is independent from one channel use to the next. Additionally, the elements of H are assumed to be independent complex Gaussian random variables with zero mean and unit variance.

Figure 2:
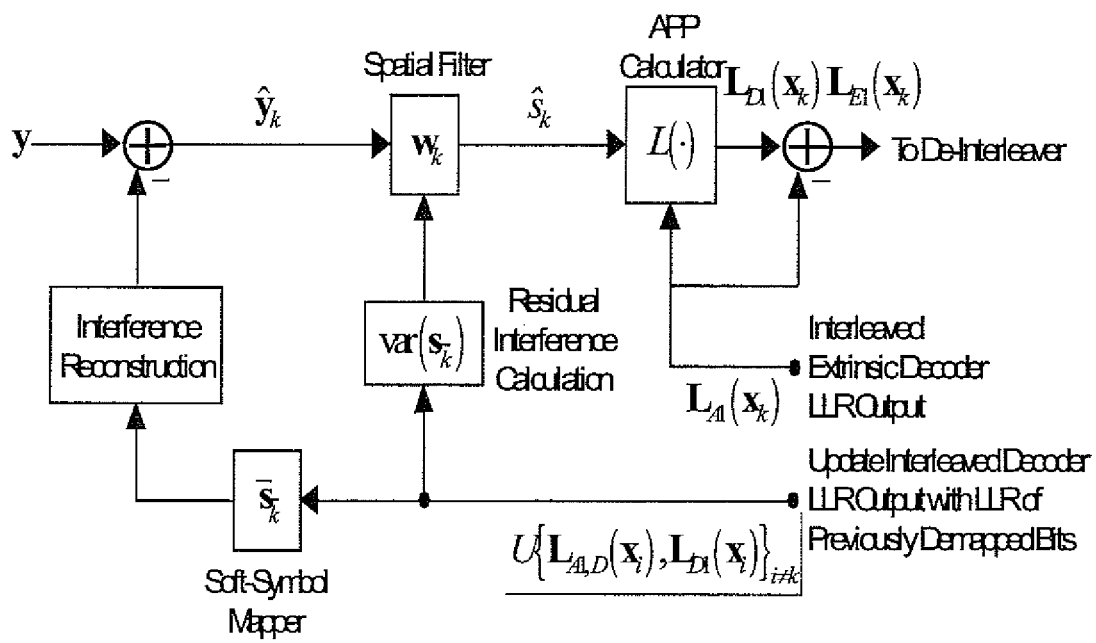
FIG. 2 is a schematic representation of a successive single stream demapper for the kth stream.

FIG. 2 shows the block schematic of the S-SSD 200. The successive single-stream demapper, unlike the parallel single-stream demapper, demaps streams sequentially with the output of each demapped stream impacting the performance of subsequently demapped stream. Therefore, the order in which streams are demapped becomes important. The input to the demapper is the received signal vector and its output is the soft information or the log-likelihood ratio (LLR) values of the bits corresponding to the stream of interest. Prior to the LLR computation in the APP calculator 202, two key operations need to be performed: 1) soft interference cancellation and 2) soft spatial-filtering of interference from the other streams.

The details of the various operations, namely soft interference cancellation, soft spatial filtering, ordering and the APP calculation, are described next A. Soft Interference Cancellation Assume that we are interested in demapping the k th stream as shown in FIG. 2. The first step in demapping is to remove the contribution of the interfering streams (that is, all but the k th stream) from the received signal vector y by a straightforward cancellation process, where reconstructed interfering symbols, after appropriate filtering through their channel responses, are subtracted from the received signal vector. The interfering symbols may be reconstructed using either the LLR value $\{L_{A1,D}(x_l)\}_{l \neq k}$ fed back from the decoder or the LLR value $\{L_{D1}(x_l)\}_{l \neq k}$ computed in the demapper. To maximize the rate at which the reliability of the soft-information improves with iterations, one should always use the most recent LLR value for interference reconstruction. Note that the LLR value used for reconstructing the symbols should always be the total LLR and not the extrinsic LLR.

A specific example can be very illustrative here. Without loss of generality, let the optimally ordered set be $\{1, 2, \ldots, N_t\}$, where the indices of the streams are chosen according to some scheme (to be discussed later). According to this ordering, stream 1 is demapped first, then stream 2, and so on with the $N_t$ last stream demapped. Let us also assume that one iteration has been completed and that the detection process has cycled back to the beginning of the demapping process of the second iteration. For this scenario, consider how the LLR values are chosen for reconstructing the interfering symbols during the demapping of stream 1 and stream 2.

During the demapping of stream 1, the newest LLR values available for interfering streams are those from the soft-decoder of iteration 1. Therefore, all of the interfering symbols are reconstructed using the interleaved LLR outputs from the decoder $\{L_{A1,D}(x_l)\}_{l \neq i}$ Let the output LLR value from the demapping of stream 1 be denoted as $L_{D1}(x_l)$. Clearly, this value is the result of a more recent APP computation than the one during the decoding of iteration 1. Hence, this is the value that will be used in reconstructing stream 1 and cancelling its contribution during the demapping of subsequent streams. Therefore, during the demapping of stream 2, interfering symbol 1 is reconstructed using this newly computed LLR during the demapping of stream 1. All other interfering symbols will be estimated using the LLRs from the decoder of iteration 1 as none of them have been demapped yet to yield an updated LLR. Therefore, in general, the soft-information set used for reconstructing the interfering symbols when demapping the k th stream may be represented as $\{U(L_{A1,D}(x_l), L_{D1}(x_l))\}_{l \neq k}$, where $U(X,Y)$ is a function defined such that it is equal to X if X is obtained from a more recent computation than Y. Otherwise, if Y is obtained from a more recent computation, then $U(X,Y)$ equals Y.

Next proceed to the computation of the reconstructed symbol values. The reconstructed soft value for the l th stream symbol is its expected value, and is computed as $$\bar{s}_l = \sum_{i=1}^{2^M} a_i P(s_l = a_i) \quad (2)$$

$$= \sum_{i=1}^{2^M} a_i \sum_{m=1}^{M} P(x_{l,m} = b_{i,m})$$

where $P(s_l = a_i)$ is the probability that the l th stream contains the symbol $a_i$, $b_{i,m}$ is the m th bit of symbol $a_i$, and $P(x_{l,m} = b_{i,m})$ is the probability that $x_{l,m}$, the m th bit of the l th stream, takes the value $b_{i,m}$. The second step in (2) follows from the assumption that the LLR values of bits within a symbol are independent due to interleaving. Given the definition of the LLR, $P(x_{l,m} = b_{i,m})$ may be computed as $$P(x_{i,m} = b_{i,m}) = \frac{1}{1 + e^{-b_{i,m} L(x_{i,m})}} \quad (3)$$

where $L(x_{l,m})$ is the LLR value of $x_{l,m}$. In the S-SSD case, $L(x_{l,m})$ is set to its most recent value $U(L_{A1,D}[m,l], L_{D1}[m,l])$, where the LLR argument [m,l] simply denotes the mth bit of the lth stream. Thus, using (2) and (3), reconstruct the symbols using their bit-wise LLR values.

Next, the reconstructed symbols are filtered with their channel responses to yield their contribution towards the received signal vector y. Finally, the soft interference canceller for the k th stream demapper removes contributions from the interfering streams, and produces a "cleaned" received vector as follows $$\hat{y}_k = y - H_{\bar{k}} \bar{s}_{\bar{k}} \quad (4)$$

Here, $H_{\bar{k}}$ is the collection of the channel responses for the interfering streams and $\bar{s}_{\bar{k}}$ is the corresponding collection of the reconstructed soft-symbol values of the interfering streams.

The "cleaned" signal may contain some residual interference depending on the quality of the reconstructed symbol.

B. Spatial Filtering

After the interference cancellation operation, as shown in FIG. 2, the output of the canceller $\hat{y}_k$ is passed through a spatial-filter $w_k$. The spatial-filter proposed in this invention is based on the minimum mean square error (MMSE) criterion. The MMSE filter $w_k$, by definition, minimizes the mean squared error between the MMSE estimate $w_k^H \hat{y}_k$ and the desired symbol $s_k$. That is, $w_k$ minimizes the cost function $$J(w) = \langle |w^H \hat{y}_k - s_k|^2 \rangle \tag{5}$$

From standard adaptive filter analysis, we know that $w_k$ is determined by setting the gradient of J(w) to zero, and is given as $$w_k = E\{\hat{y}_k \hat{y}_k^H\}^{-1} E\{\hat{y}_k s_k^*\} \tag{6}$$

Substituting for y (using (1)) in (4), $\hat{y}_k$, may be re-expressed as $$\hat{y}_k = \underbrace{h_k s_k}_{\text{desired stream}} + \underbrace{H_{\bar{k}} s_{\bar{k}}}_{\text{MAI}} - \underbrace{H_{\bar{k}} \bar{s}_{\bar{k}}}_{\text{reconstructed MAI}} + n \tag{7}$$

$$= h_k s_k + \underbrace{H_{\bar{k}}(s_{\bar{k}} - \bar{s}_{\bar{k}})}_{\text{residual MAI}} + n$$

Assuming independence of all symbols, $$E\{\hat{y}_k \hat{y}_k^H\} = H\Phi_k H^H + 2\sigma_n^2 I_{N_r} \tag{8}$$

In (8), $\Phi_k$ is the covariance matrix of the desired and interfering streams, and is given as $$\Phi_k = \text{diag}[\sigma_{s_1}^2, \ldots, \sigma_{s_{k-1}}^2, \langle |s_k|^2 \rangle, \sigma_{s_{k+1}}^2, \ldots, \sigma_{N_t}^2] \tag{9}$$

Similarly, using the form of $\hat{y}_k$ given in (7), it is easy to see that $$E\{\hat{y}_k s_k^*\} = h_k E\{|s_k|^2\} \tag{10}$$

Substituting (8) and (10) in (6), the MMSE filter follows as $$w_k = (H\Phi_k H^H + 2\sigma_n^2 I_{N_r})^{-1} h_k E\{|s_k|^2\} \tag{11}$$

From (11), it is seen that the MMSE filter $w_k$ is completely known if the moments of all the symbols can be computed. Similar to the calculation of the first moment shown in (2), the second moments are computed follow as $$E\{|s_l|^2\} = \sum_{i=1}^{2^M} |a_i|^2 P(s_l = a_i) \tag{12}$$

$$= \sum_{i=1}^{2^M} |a_i|^2 \prod_{m=1}^{M} \frac{1}{1 + e^{-b_{i,m} L(x_{i,m})}}$$

Note that, as in the case of interference reconstruction for soft cancellation, the LLR values used here for computing the residual energy of the interfering streams are updated, whenever available, with its more recent values from the demapping stage.

C. APP Calculation

Referring to FIG. 2, we note that $\hat{s}_k = w_k^H \hat{y}_k$ is the output of the k th stream spatial filter. Obviously, this is the scalar MMSE estimate of the symbol transmitted in the k th stream. This symbol estimate $\hat{s}_k$ is fed to a single-stream APP calculator which computes the LLR values of the M bits constituting the k th symbol. The single-stream APP calculator is also referred to as a single-input single-output (SISO) APP calculator.

Given the observation $\hat{s}_k$, the LLR of the a posteriori probability for the m th bit of the k th stream is defined as $$L_{D1}(x_{k,m}) = \ln \frac{P(x_{k,m} = +1 | \hat{s}_k)}{P(x_{k,m} = -1 | \hat{s}_k)} \tag{13}$$

Applying Bayes' rule and removing the a priori part $L_{A1}(x_{k,m}) = \ln(P(x_{k,m}=+1)/P(x_{k,m}=-1))$ from $L_{D1}(x_{k,m})$ the extrinsic LLR can be expressed as $$L_{E1}(x_{k,m}) = \ln \frac{P(\hat{s}_k | x_{k,m} = +1)}{P(\hat{s}_k | x_{k,m} = -1)} \tag{14}$$

To evaluate $P(\hat{s}_k|\pm 1)$, take the expectation of $p(\hat{s}_k|s_k)$ over $s_k = \{a_i | x_{k,m} = +1\}$. Then, (14) can be re-expressed as $$L_{E1}(x_{k,m}) = \ln \frac{\sum_{a_i \in \mathcal{A}|x_{k,m}=+1} p(\hat{s}_k | s_k = a_i) P(s_k = a_i | x_{k,m} = +1)}{\sum_{a_i \in \mathcal{A}|x_{i,m}=-1} p(\hat{s}_k | s_k = a_i) P(s_k = a_i | x_{k,m} = -1)} \tag{15}$$

From (15), we see that the LLR calculation requires the computation of terms $p(\hat{s}_k|s_k=a_i)$ and $P(s_k=a_i|x_{k,m}=\pm 1)$.

First consider the term $p(\hat{s}_k|s_k=a_i)$. Since the MMSE estimate $\hat{s}_k$ is shown to approximate a Gaussian distribution, the probability distribution function $p(\hat{s}_k|s_k=a_i)$ may be expressed as $$p(\hat{s}_k | s_k = a_i) \approx \frac{1}{2\pi\sigma_{k,i}^2} \exp\left(-\frac{|\hat{s}_k - \mu_{k,i}|^2}{2\sigma_{k,i}^2}\right) \tag{16}$$

with its mean and per-real dimension variance defined as $\mu_{k,i} = \langle \hat{s}_k | s_k = a_i \rangle$ and $\sigma_{k,i}^2 = \text{var}(\hat{s}_k | s_k = a_i)/2$, respectively. Noting that $\hat{s}_k = w_k^H \hat{y}_k$, and given the definition of $\hat{y}_k$ in (7), the mean of the conditional MMSE estimate $\mu_{k,i} = \langle \hat{s}_k | s_k = a_i \rangle$ follows as $$\mu_{k,i} = \langle \hat{s}_k | s_k = a_i \rangle = w_k^H h_k a_i \tag{17}$$

Similarly, the per-real dimension variance of the conditional MMSE estimate is obtained as $$\sigma_{k,i}^2 = \text{var}(\hat{s}_k | s_k = a_i)/2 \tag{18}$$

$$= \frac{1}{2} w_k^H (H\Phi_{\bar{k}} H^H + 2\sigma_n^2 I_{N_r}) w_k$$

where $\Phi_{\bar{k}}$ is equal to $\Phi_k$ with the k th diagonal element zeroed out. Since $\sigma_{k,i}^2$ is independent of $a_i$, the subscript i is dropped from its subsequent references.

Next, we consider the term $P(s_k=a_i|x_{k,m}=\pm 1)$. Assuming the constituent bits of a symbol to be independent due to interleaving, this term can be expressed as a product of its constituent bit probabilities as $$P(s_k = a_i | x_{k,m} = b) = \prod_{\substack{n=1 \\ n \neq m}}^{M} P(x_{k,n} = b_{i,n}) \quad (19)$$

The constituent bit probability $P(x_{k,n} = b_{i,n})$ may be expressed in terms of the a priori information $L_{A1}(x_{k,n})$ as $$P(x_{k,n} = b_{i,n}) = \frac{e^{b_{i,n} L_{A1}(x_{k,n})/2}}{e^{L_{A1}(x_{k,n})/2} + e^{-L_{A1}(x_{k,n})/2}} \quad (20)$$

Substituting (16), (9), and (20) in (15), and using the Max-log approximation ln $$\sum_j d_j \approx \max_j \ln d_j,$$

the extrinsic LLR can be written as $$L_{E1}(x_{k,m}) \approx \max_{\substack{x \in X_{m,+1} \\ a_i = map(x)}} \frac{1}{2} \left\{ -\frac{|\hat{s}_k - \mu_{k,i}|^2}{\sigma_k^2} + x_{[m]}^T \cdot L_{A1,[m]}(x_k) \right\} - \max_{\substack{x \in X_{m,+1} \\ a_i = map(x)}} \frac{1}{2} \left\{ -\frac{|\hat{s}_k - \mu_{k,i}|^2}{\sigma_k^2} + x_{[m]}^T \cdot L_{A1,[m]}(x_k) \right\} \quad (21)$$

where $x_{m,b}$ denotes the set of all possible M×1 bit vectors x whose m th bit value is b, $x_{[m]}$ is the subvector of x omitting the m th element, and $L_{A1,[m]}(x_k)$ is an (M−1)×1 vector containing the a priori information for the k th stream with the mth element omitted. Unlike the APP computation in the MSD case, the number of hypotheses is limited to the alphabet size resulting in linear complexity in the number of streams.

D. Ordering

As mentioned earlier, the order in which the streams are demapped is critical to the performance of the successive SSD approach. Since the spatial filter in the demapper is MMSE-based, conjecture that the optimal ordering must also use the same MMSE criterion. Using (5) and (11), the minimum mean square error for the n th stream can be shown to be $$\Lambda_n = E\{|s_n|^2\}(1 - w_n^H h_n) \quad (22)$$

At any given iteration, the stream which has the minimum MMSE is chosen for demapping first. Once this stream is demapped, its LLR value is updated using the newly computed demapper APP values. The MMSE for all of the remaining streams, which depends on the variance of the reconstructed symbol of the demapped stream, is recomputed. The stream with the minimum MMSE among these remaining streams is chosen for demapping. This process continues until all streams are demapped.

The reason for picking the stream with the lowest MMSE first is based on the following heuristic. As each stream is demapped, its soft-information is updated allowing for a more accurate reconstruction of that symbol. This results in better interference cancellation during the demapping of the remaining streams. Based on this ordering, the stream that is demapped last experiences the greatest benefit because all of its interfering streams are reconstructed from using LLRs of the highest quality possible. Since the total error performance is limited by the weakest stream, postulate that the optimal strategy would be to provide the highest benefit in cancellation to the weakest stream (as measured using the MMSE metric). It follows then that the streams should be demapped from the strongest to the weakest.

II. Iterative Processing for Single Stream Demappers

The actual iterative processing (or Turbo detection) takes place as shown in FIG. 2. Once $L_{E1}$, the extrinsic LLRs for a frame of coded bits is computed, it is de-interleaved and becomes the a priori input $L_{A2}(c)$ to the soft-in soft-out (SISO) channel decoder. The SISO decoder may be implemented using a BCJR or log-MAP algorithm. The SISO decoder then computes $L_{D2}(c)$, the LLR on the coded bits. The a priori input $L_{A2}(c)$ is subtracted from $L_{D2}(c)$ to obtain the extrinsic LLR $L_{E2}(c)$. $L_{E2}(c)$ is fed back to the demapper to as it's a priori input. This exchange of soft-information between the demapper and the decoder continues until some specified stopping criteria are met. Final decisions on the information bit sequence are made as hard decisions on the SISO decoder output $L_{D2}(u)$. $L_{D2}(u)$ is the LLR value on the information bits computed by the decoder. Up to this point, the iterative soft-information exchange process between the demapping and decoding stages is similar to that described for the conventional joint stream demapper. In the single stream demapper (successive and parallel types), however, there is a minor difference in the type of LLR values fed back from the SISO decoder to the demappers. Here, in addition to the extrinsic LLR values, the total a posteriori LLR value $L_{D2}(c)$ is also fed back to the demapping stage. The total LLR is what is used for reconstructing the soft symbols for inter-stream interference cancellation.

III. Numerical Results & Discussion

To evaluate the performance of the proposed demapper, the following system parameters are used. The outer channel code is a rate-1/2 turbo code similar to the one specified in 0. Eight iterations are used within the turbo SISO decoder. Each data packet contains 9216 information bits. A random interleaver is used to decorrelate the bits between the demapper and decoder stages. The bit-to-symbol mapping is based on a 16-QAM constellation with Gray labeling. Multiple packets are transmitted through independent channel instantiations to gather packet error rate (PER) statistics.

Figure 3:
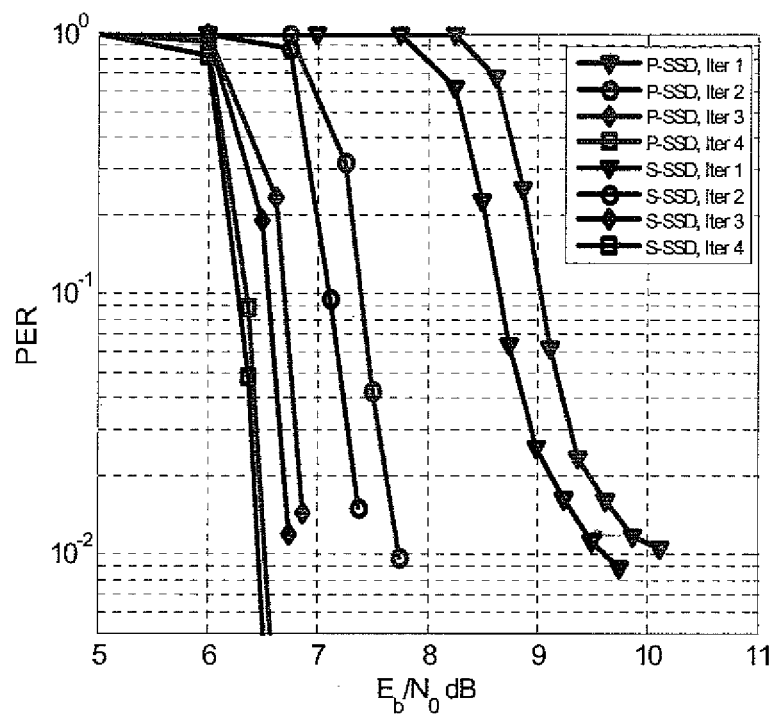
FIG. 3 is a graph of PER performance for P-SSD versus S-SSD for 4×4 MIMO.
Figure 4:
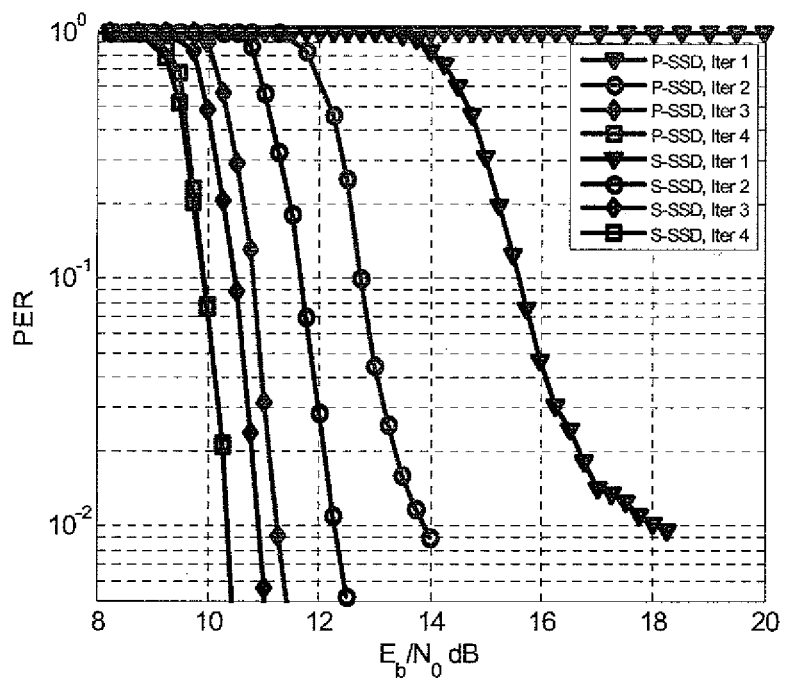
FIG. 4 is a graph of PER performance for P-SSD versus S-SSD for 4×3 MIMO.

FIGS. 3 and 4 show the average PER versus $E_b/N_0$ performance for the successive single-stream demapper and parallel single-stream demapper for a 4×4 and 4×3 MIMO configuration, respectively. Here, $E_b/N_0$ is defined as the ratio of the energy per information bit to the noise spectral density, and is related to the average signal-to-noise ratio per-receive element SNR as $E_b/N_0 = SNR (N_r/(N_tMR))$.

From both FIG. 3 and FIG. 4, it is clear that the single stream demapper based on the successive approach has performance comparable to or better than the one based on the parallel approach. The performance gain can be attributed to the improved interference cancellation and suppression realized by fully exploiting the soft-information updates that become available as the streams are being demapped one at a time.

The performance improvement is more pronounced when using fewer iterations between the demapping and decoding stages, making the proposed approach particularly suited for low-latency applications. The performance gain is also significant for overloaded scenarios—for example, when using fewer receive elements than transmit streams as evidenced in the 4×3 case of FIG. 4. For a single iteration using four receive elements, the performance gain is about 0.75 dB, whereas using three receive elements, the gain is infinite. By "infinite", it is meant that, unlike the successive approach, a satisfactory PER can never be achieved by the parallel approach, no matter how high the transmit power. For the same reason that this approach yields high gains in overloaded MIMO configurations, it will also excel in scenarios where the channel becomes heavily correlated—for example, when a strong line-of-sight component is present. Furthermore, the ability to operate in overloaded conditions using fewer receive array elements can also be leveraged to realize MIMO deployments with low-profile arrays at one end of the link. Alternatively, this property of the successive method also makes it particularly suited for operations in interference-rich environments where added link robustness may require some of the receive elements to be devoted to interference nulling as opposed to separation of the spatially-multiplexed streams.

To close the gap between iterative MIMO receivers based on low-complexity single-stream demappers and those based on the more complex joint-stream demappers, a successive framework is employed. The framework performs significantly better than its predecessor, which uses a parallel approach. Performance gains are most notable for low-latency applications and operation in overloaded scenarios, such as when the channel becomes heavily correlated or when low-profile array requirements dictate fewer antenna elements on one end of the link. The observed performance gain in overloaded conditions makes this method also appealing for MIMO deployments in interference-rich environments.

Various aspects of the present disclosure may be embodied as a program, software, or computer instructions embodied in a computer or machine usable or readable device, which causes the computer or machine to perform the steps of the method when executed on the computer, processor, and/or machine.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as handheld, desktop, laptop, and/or server. A module may be a component of a device, software, program, or system that implements some "functionality", which can be embodied as software, hardware, firmware, electronic circuitry, or the like.

While there has been described and illustrated a multiple-input multiple output system for demapping, it will be apparent to those skilled in the art that variations and modifications are possible without deviating from the broad principles of the invention which shall be limited solely by the scope of the claims appended hereto.

What has been claimed is:

1. A method comprising:
    receiving, by a processor, a vector comprising symbol streams from a plurality of transmit antennae; and
    removing, by the processor, a contribution of the symbol streams from the received vector to produce a less corrupted version of the received vector by individually demapping each of the symbol streams comprising the received vector successively, in accordance with an optimal order, the demapping comprising:
        calculating, by the processor, a log-likelihood ratio (LLR) value for each stream of the symbol streams;
        optimizing, by the processor, ordering of the symbol streams to enable interference cancellation during demapping of a first stream of the symbol streams, wherein optimizing ordering comprises applying a spatial filter to the symbol streams and selecting a best stream from the symbol streams as the first stream to be demapped;
        demapping, by the processor, each individual symbol stream of the symbol streams successively from the received vector in accordance with the optimized order by successively reconstructing, by the processor, each symbol stream and removing the contribution of each symbol stream individually from the received vector, wherein the reconstructing comprises utilizing the more current of an LLR value fed back from a decoder or an LLR value from a previous demapping; and
        filtering, by the processor, each reconstructed symbol stream with its respective channel response and removing the filtered symbol stream from the received vector.

2. The method as set forth in claim 1, wherein applying the spatial filter comprises selecting a symbol stream which has a lowest mean squared error (MSE) as the first stream.

3. The method of claim 2, further comprising,
    recomputing, by the processor, after demapping the first stream, the MSE of the remaining symbol streams; and
    selecting, by the processor, of the remaining symbol streams, a symbol stream with the lowest MSE for demapping, and repeating, by the processor, said selecting until all symbol streams are demapped.

4. The method of claim 1, wherein the reconstructing comprises computing the LLR value.

5. The method of claim 1, wherein the spatial filter is based on zero-forcing (ZF) criterion.

6. The method of claim 1, wherein the transmit antennae comprise an ST-BICM transmitter and each antenna of an ST-BICM transmitter transmits an independent symbol stream.

7. The method as set forth in claim 1, wherein the transmit antennae comprise an ST-BICM transmitter and each antenna of an ST-BICM transmitter transmits a mapping of multiple symbol streams.

8. A computer readable device having computer readable program code for recovering a bit data sequence from a received signal that comprises a plurality of symbols transmitted by a space-time bit-interleaved coded modulation (ST-BICM) transmitter comprising:
    receiving, by a processor, a vector comprising symbol streams from a plurality of transmit antennae; and
    removing, by the processor, a contribution of the symbol streams from the received vector to produce a less corrupted version of the received vector by individually demapping each of the symbol streams comprising the received vector successively, in accordance with an optimal order, the demapping comprising:
        calculating, by the processor, a log-likelihood ratio (LLR) value for each stream of the symbol streams;

optimizing, by the processor, ordering of the symbol streams to enable interference cancellation during demapping of a first stream of the symbol streams, wherein optimizing ordering comprises applying a spatial filter to the symbol streams and selecting a best stream from the symbol streams as the first stream to be demapped;

demapping, by the processor, each individual symbol stream of the symbol streams successively from the received vector in accordance with the optimized order by successively reconstructing, by the processor, each symbol stream and removing the contribution of each symbol stream individually from the received vector, wherein the reconstructing comprises utilizing the more current of an LLR value fed back from a decoder or an LLR value from a previous demapping; and filtering, by the processor, each reconstructed symbol stream with its respective channel response and removing the filtered symbol stream from the received vector.

9. The computer readable device as set forth in claim 8, wherein applying the spatial filter comprises selecting a symbol stream which has a lowest mean squared error (MSE) as the first stream.

10. The computer readable device as set forth in claim 9, further comprising:

recomputing, by the processor, after demapping the first stream, the MSE of the remaining symbol streams; and selecting, by the processor, of the remaining symbol streams, a symbol stream with the lowest MSE for demapping, and repeating, by the processor, said selecting until all symbol streams are demapped.

11. A system comprising:

a memory device; and a processor communicably coupled to the memory device, the processor to:

receive a vector comprising symbol streams from a plurality of transmit antennae; and remove a contribution of the symbol streams from the received vector to produce a less corrupted version of the received vector by individually demapping each of the symbol streams comprising the received vector successively, in accordance with an optimal order, the demapping comprising:

calculating, by the processor, a log-likelihood ratio (LLR) value for each stream of the symbol streams;

optimizing, by the processor, ordering of the symbol streams to enable interference cancellation during demapping of a first stream of the symbol streams, wherein optimizing ordering comprises applying a spatial filter to the symbol streams and selecting a best stream from the symbol streams as the first stream to be demapped;

demapping, by the processor, each individual symbol stream of the symbol streams successively from the received vector in accordance with the optimized order by successively reconstructing, by the processor, each symbol stream and removing the contribution of each symbol stream individually from the received vector, wherein the reconstructing comprises utilizing the more current of an LLR value fed back from a decoder or an LLR value from a previous demapping; and filtering, by the processor, each reconstructed symbol stream with its respective channel response and removing the filtered symbol stream from the received vector.

12. The system as set forth in claim 11, wherein applying the spatial filter comprises selecting a symbol stream which has a lowest mean squared error (MSE) as the first stream.

13. The system as set forth in claim 12, the processor further to:

recompute, after selecting the first symbol stream, the MSE of the remaining symbol streams; and select of the remaining symbol streams, a symbol stream with the lowers MSE for demapping, and repeating, by the processor, said selecting until all symbol streams are demapped.

14. The system as set forth in claim 11, wherein said reconstruct comprises compute the LLR value.

15. The system as set forth in claim 11 wherein the spatial filter is based on zero-forcing (ZF) criterion.

16. The system as set forth in claim 11, wherein the transmit antennae comprise an ST-BICM transmitter and each antenna of an ST-BICM transmitter transmits an independent stream.

17. The system as set forth in claim 11, wherein the transmit antennae comprise an ST-BICM transmitter and each antenna of an ST-BICM transmitter transmits a mapping of multiple streams.

* * * * *